United States Patent
Kawamoto et al.

[11] Patent Number: 5,924,127
[45] Date of Patent: Jul. 13, 1999

[54] ADDRESS TRANSLATION BUFFER SYSTEM AND METHOD FOR INVALIDATING ADDRESS TRANSLATION BUFFER, THE ADDRESS TRANSLATION BUFFER PARTITIONED INTO ZONES ACCORDING TO A COMPUTER ATTRIBUTE

[75] Inventors: Koji Kawamoto; Hiromichi Kainoh; Kuniki Tohbaru, all of Hadano, Japan

[73] Assignees: Hitachi, Ltd., Tokyo; Hitachi Information Technology Co., Ltd., Hadano, both of Japan

[21] Appl. No.: 08/714,395

[22] Filed: Sep. 16, 1996

[30] Foreign Application Priority Data

Sep. 19, 1995 [JP] Japan .................................. 7-239385

[51] Int. Cl.$^6$ .................................................. G06F 12/10
[52] U.S. Cl. .................................................. 711/207; 711/6
[58] Field of Search .................................... 711/206, 207, 711/6, 205

[56] References Cited

U.S. PATENT DOCUMENTS

| | | | |
|---|---|---|---|
| 4,456,954 | 6/1984 | Bullions, III et al. | 711/207 |
| 4,779,188 | 10/1988 | Gum et al. | 395/500 |
| 4,816,991 | 3/1989 | Watanable et al. | 711/206 |
| 5,317,705 | 5/1994 | Gannon et al. | 711/207 |
| 5,317,710 | 5/1994 | Ara et al. | 711/207 |

FOREIGN PATENT DOCUMENTS

| | | |
|---|---|---|
| A-60-138654 | 7/1985 | Japan . |
| A-4-81951 | 3/1992 | Japan . |
| A-5-151085 | 6/1993 | Japan . |

OTHER PUBLICATIONS

Coscarella et al., "System for Purging TLB" IBM Technical Disclosure Bulletin, vol. 24, No. 2, Jul. 1981, pp. 910–911.

*Primary Examiner*—Eddie P. Chan
*Assistant Examiner*—Yamir Encarnacion
*Attorney, Agent, or Firm*—Antonelli, Terry, Stout & Kraus, LLP

[57] ABSTRACT

An address translation buffer system in which a searching time of an address translation buffer is shortened. The address translation buffer includes an address translation buffer connected to a translation table for translating a virtual address to a real address, the address translation buffer containing a plurality of columns holding a plurality of entries each having a pair of the virtual address and the real address translated based on the translation table and also having a virtual machine classification indicative of a type of the virtual address, a plurality of column control circuits for specifying columns of the address translation buffer with a combination of a lower part of the virtual address and the virtual machine classification as an entry, and circuits, in accordance with an invalidation instruction for purging one of the entries of the address translation buffer, for searching one of the columns of the address translation buffer having one of the entries of the address translation buffer coincided with the virtual machine classification entry of the invalidation instruction and for invalidating the entry including a specified field. It is unnecessary to search a group of columns having values other than the specified virtual machine classification.

21 Claims, 14 Drawing Sheets

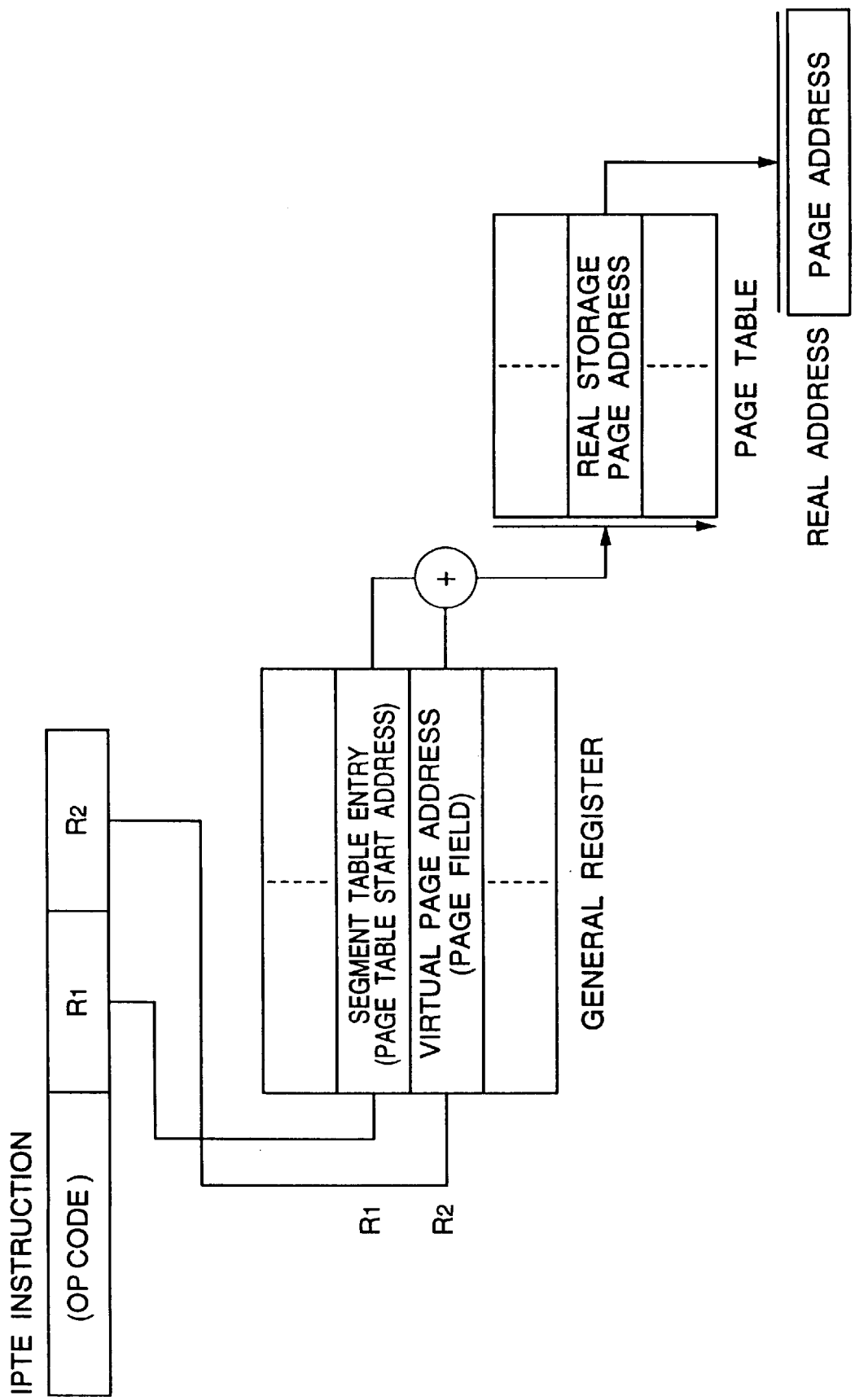

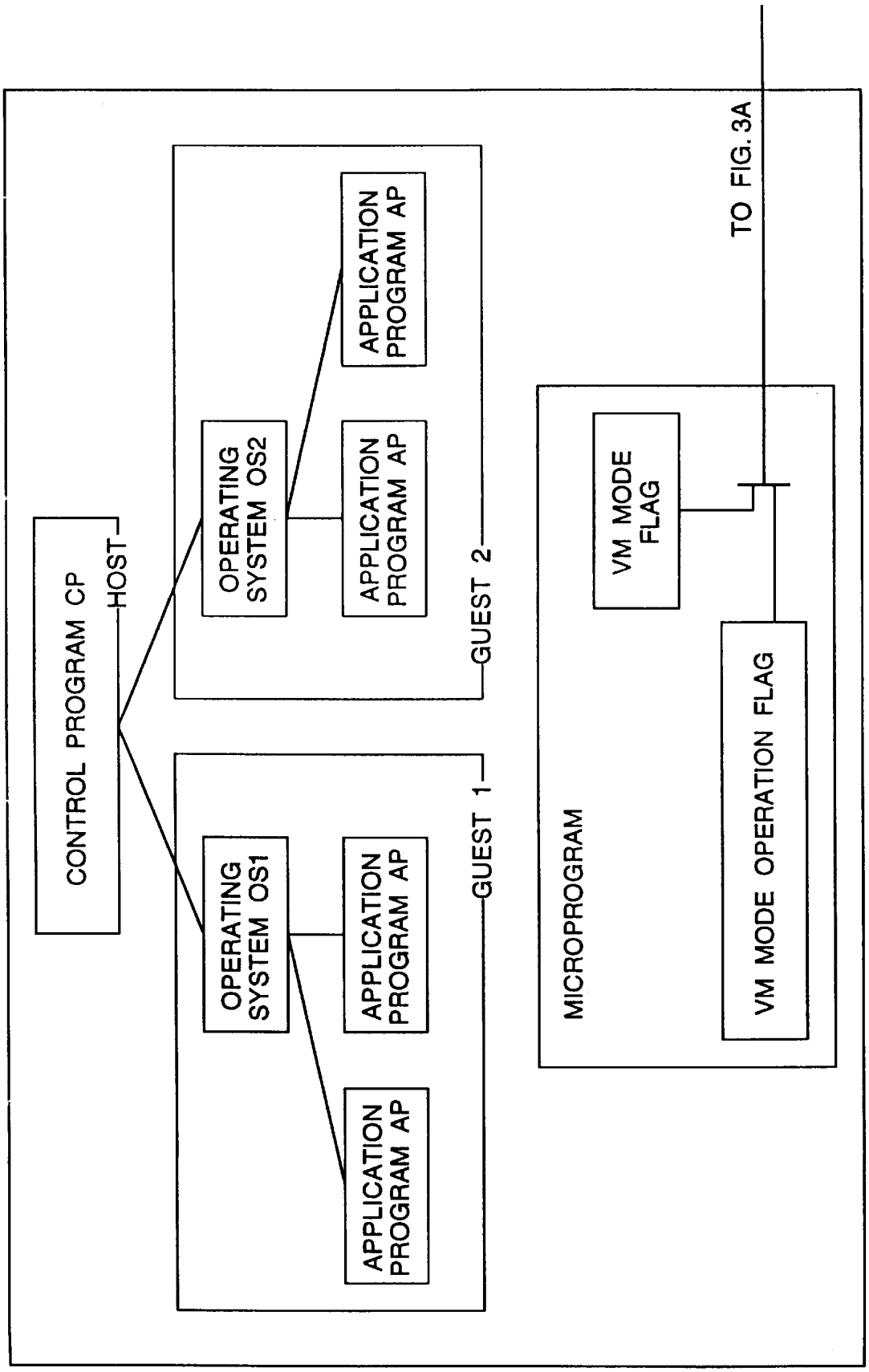

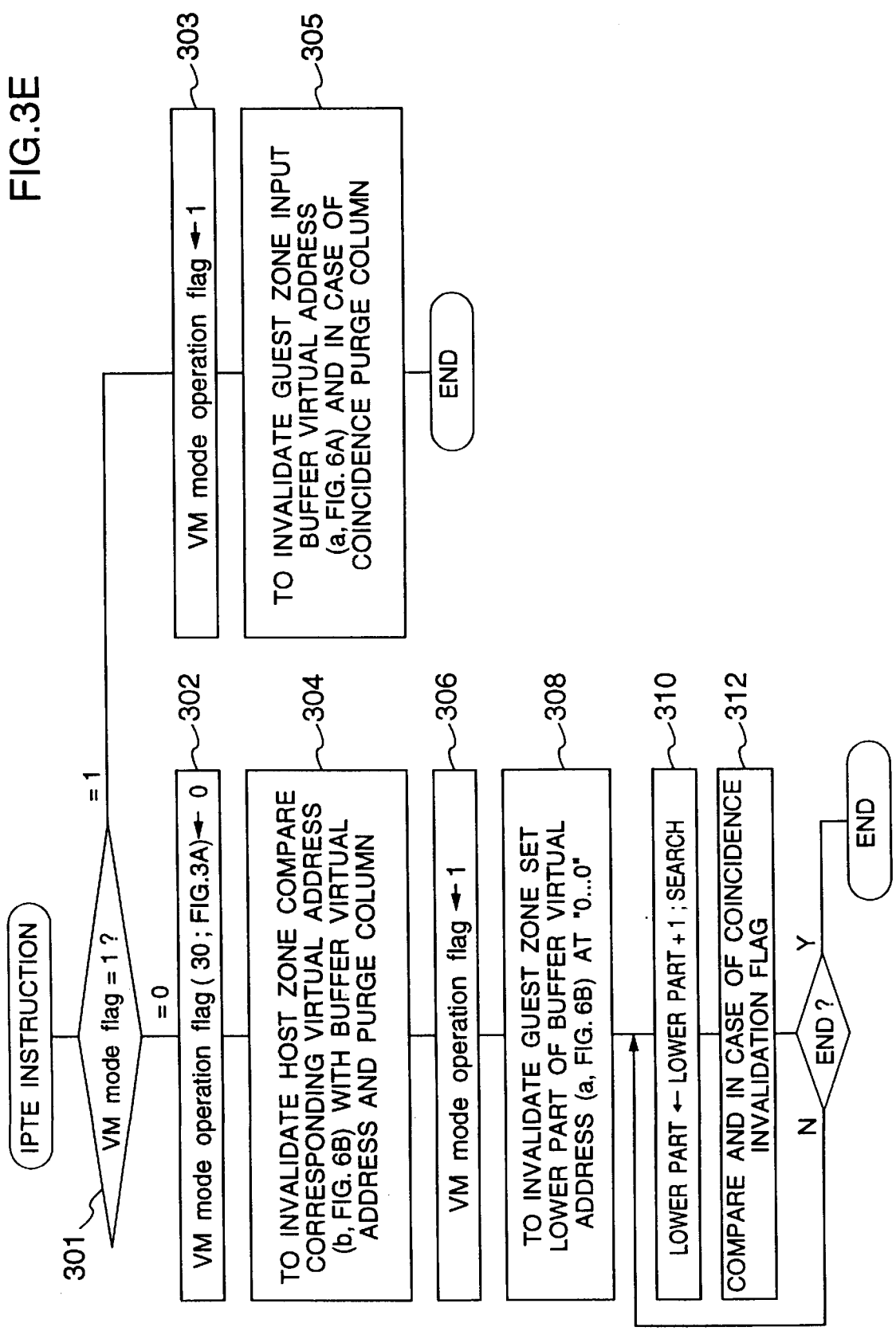

FIG.4A

BEFORE MACHINE ATTRIBUTE DIVISION

| VIRTUAL ADDRESS | REAL ADDRESS | MACHINE ATTRIBUTE |
|---|---|---|
|  |  |  |
| d | f | guest |
| e | f | host |
| b | c | host |
|  |  |  |
| a | c | guest |
|  |  |  |

FIG.4B

AFTER MACHINE ATTRIBUTE DIVISION

| | VIRTUAL ADDRESS | REAL ADDRESS | MACHINE ATTRIBUTE |
|---|---|---|---|
| | | | |
| HOST ZONE | e | f | host |
| | b | c | host |
| | | | |
| GUEST ZONE | d | f | guest |
| | a | c | guest |
| | | | |

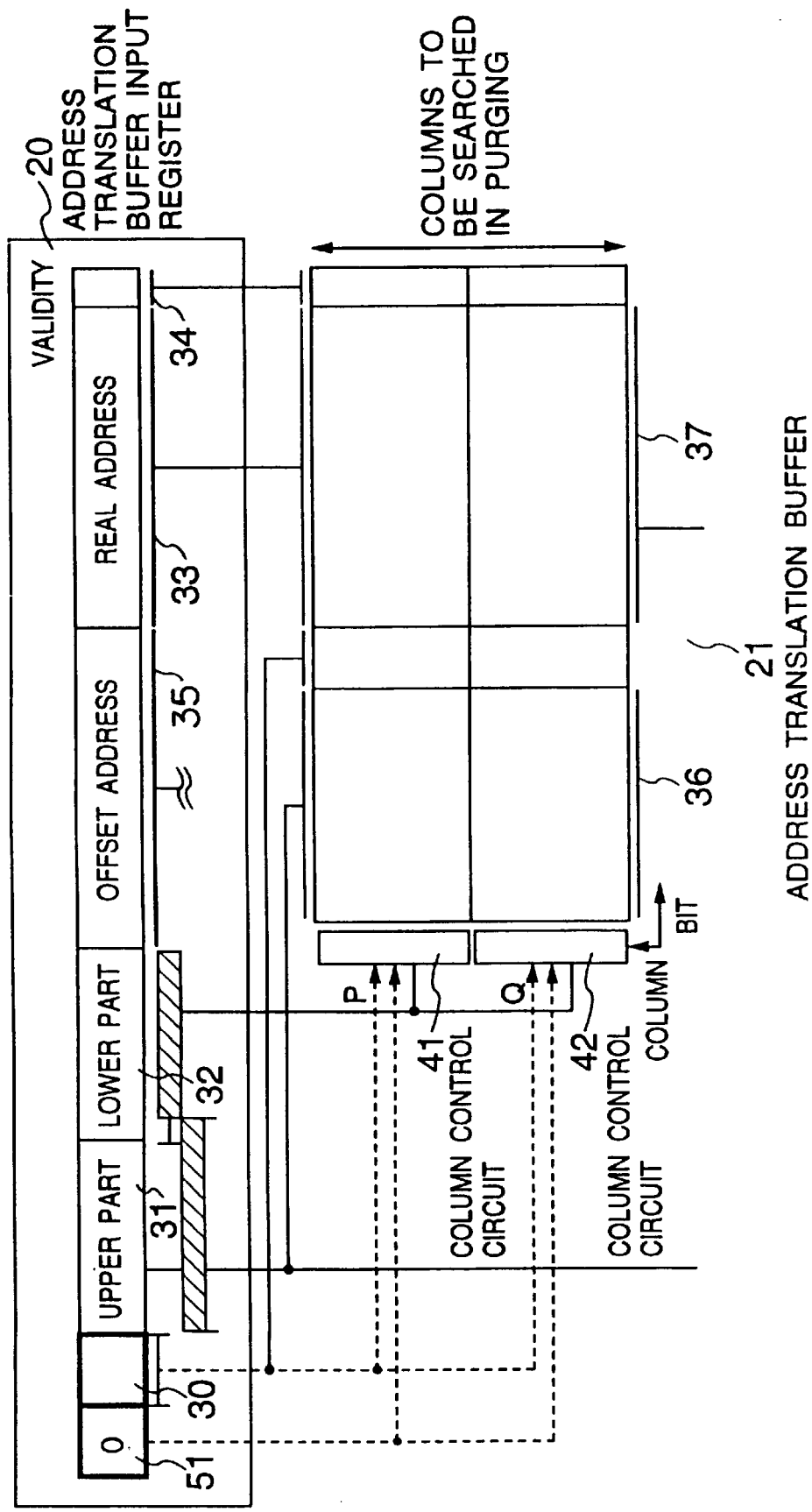

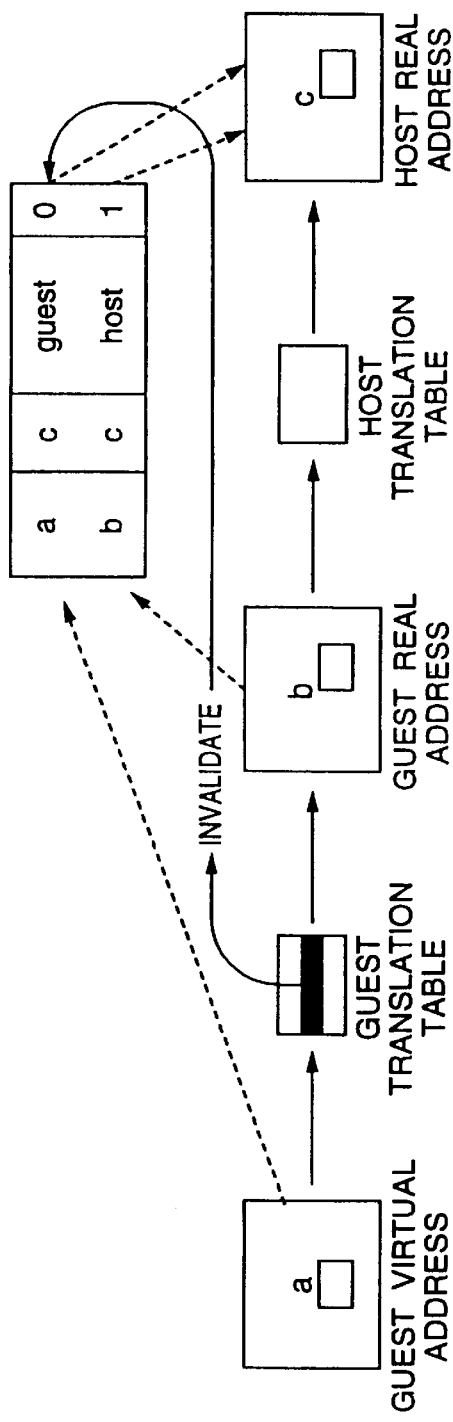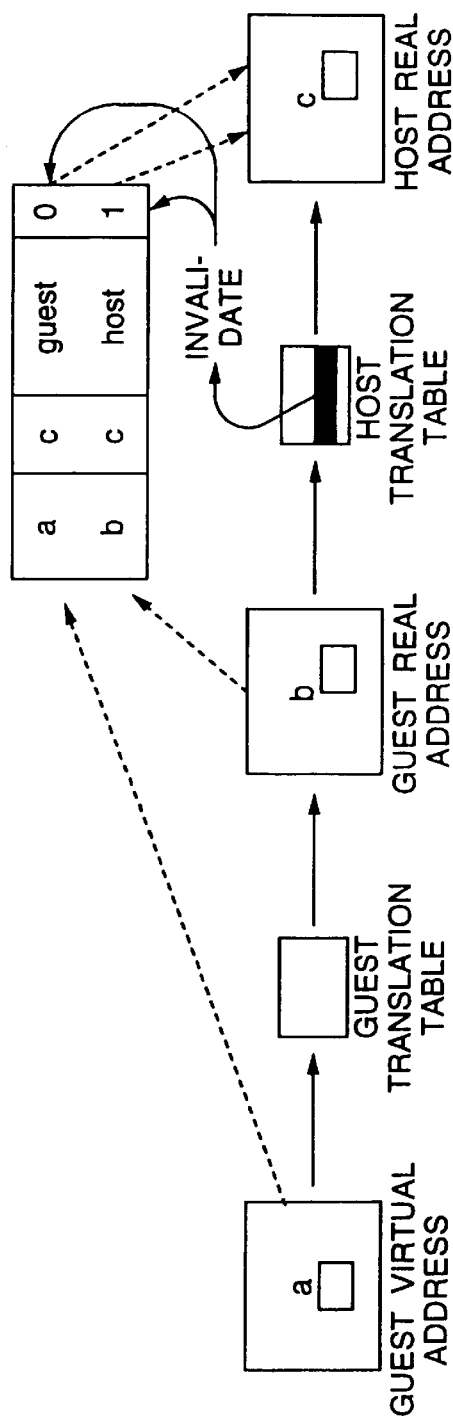

ADDRESS TRANSLATION BUFFER SYSTEM AND METHOD FOR INVALIDATING ADDRESS TRANSLATION BUFFER, THE ADDRESS TRANSLATION BUFFER PARTITIONED INTO ZONES ACCORDING TO A COMPUTER ATTRIBUTE

BACKGROUND OF THE INVENTION

The present invention relates to an information processor of a virtual computer system which comprises an address translation buffer (also called a translation look-aside buffer) and more particularly, to an address translation buffer system which can suitably shorten an effective processing time required for invalidating entries in an address translation buffer and also to a method for invalidating the address translation buffer.

In general, a virtual storage information processor, when it is desired to perform address translating operation from a virtual address to a real address as shown in FIG. 1B, utilizes two translation tables provided in a real storage of a main memory as shown in FIG. 1A. The translation table comprises a segment table for managing virtual addresses on a so-called segment basis and page tables for managing, on a page basis, pages into which the segments in the segment table are further divided. The segment table has start addresses of the respective page tables or page table origins and a plurality of entries (refer to arrows in FIG. 1B); whereas, the page tables has real page addresses of the respective pages and validity bits as well as a plurality of entries. For the purpose of making the speed of the address translating operation faster than that based on such segment and page tables as shown in FIG. 1A, there may be provided an exclusive address translation buffer which stores therein a plurality of entries each including a pair of the virtual and real addresses previously found through the address translating operation based on look-up of the segment/page tables. The information processor, when receiving a request to convert or translate a virtual address to a real address and when the virtual address requested is already stored in the address translation buffer, can read out the real address corresponding to the virtual address from the address translation buffer.

In such a virtual storage information processor, there may occur such a situation that an entry already stored in the address translation buffer becomes unnecessary as a program so far being run ends. When the entry is subjected to an invalidating operation, this can be prevented from adversely affecting another program to be later run. In this case, the later program can utilize the purged part in the buffer. As one of instructions to cause purge of the address translation buffer, there is an instruction IPTE (invalidate page table entry). The IPTE instruction causes invalidation of a specified page table entry in a real storage. In the case where there is an entry registered or stored in the address translation buffer with use of the page table entry, it is also necessary to invalidate the stored entry.

Meanwhile, a virtual machine system is such a system that a plurality of operating systems (OSs) can be executed on a single real or bare machine. The 'virtual machine' in the system was named, after the fact that each OS executes a plurality of user or application programs (APs) and looks as if it is an independent machine. In the virtual machine system, these OSs are called guests while a control program (CP) for managing the OSs is called a host. FIG. 2 is a diagram for explaining the conception of a virtual machine system. In the drawing, two OSs (guests) are operated under control of a CP (host) respectively independently, but if necessary, the OSs may be operated under control of the respective OSs.

In the virtual machine system, address spaces for the guests are allocated in a virtual address space for the host, so that the memory management of the entire system is carried out through two stages of address translating operations, that is, a guest address translating operation for converting a guest virtual address to a guest real address on each guest and a host address translating operation for converting a host virtual address to a host real address on the host. For this reason, there are provided a guest translation table for finding a real address from the guest virtual address and a host translation table for finding a real address from the host virtual address.

The guest virtual address on the guest is converted or translated to a guest real address or host virtual address on the basis of whether the guest translation table or guest page table on the guest (guest address translation); while, the host virtual address is translated to a host real address on the basis of the host translation table or host page table. That is, the address translating operation is carried out twice. The virtual address of the OS managing program CP or host virtual address is translated to a host real address on the basis of the host translation table on the host.

As a result, when it is desired to store or register a guest virtual address in the address translation buffer, an entry including a pair of the guest virtual address and host real address is registered. When it is desired to register a host virtual address, an entry is registered including a pair of the host virtual address and host real address. Accordingly, there is a possibility that a guest virtual address and a host virtual address are registered for an identical host real address. To avoid this, a field (which will be referred to as the machine attribute or VM class or mode, hereinafter) for making a distinction between the host and guest is provided to each entry, and the entry is registered in the address translation buffer simultaneously with the address and the like. As a result, it can be uniquely determined whether the entry stored in the address translation buffer has the guest virtual address or host virtual address.

The aforementioned IPTE instruction may be issued from any of the application programs, operating system and control program shown in FIG. 2.

The IPTE instruction in the virtual machine system performs its invalidating operation over a specified page table entry and its invalidating operation over an entry, if present, registered in the address translation buffer with use of the page table entry. In the invalidating operation of the address translation buffer based on the invalidation of the page table entry in the virtual machine system, the entry invalidating operation in the address translation buffer varies depending on the fact that whether the page table entry to be invalidated is the guest page table entry or the host page table entry. More specifically, in the invalidation of the guest page table entry, invalidating operation is carried out over only the corresponding entry in the address translation buffer. In the invalidation of the host page table entry, on the other hand, when there is an entry of a guest virtual address which uses the host page table entry, it is necessary to invalidate, in addition to the corresponding entry of the address translation buffer, also to invalidate the entry of the guest virtual address.

The address translation buffer, when receiving the guest virtual address, can easily output its host real address. However, the address translation buffer, when receiving the host real address, cannot output its guest virtual address. For this reason, it is necessary to repetitively input the virtual address and output the real address to compare all entries in the address translation buffer and to perform the invalidating operation over one of the entries which address coincides with the host real address.

In this way, the virtual machine system performs its sequential searching operation by repetitively inputting the virtual addresses of all the entries under the IPTE instruction on the host. In recent information processors of the virtual storage system, the capacity of the address translation buffer has been increased and the hit rate of the address translation buffer in the address translating operation has been correspondingly improved. However, this also involves an increase in the number of entries in the address translation buffer, which leads to an increase in the number of entries to be searched by the above host IPTE instruction. Accordingly, in the virtual machine system, there arises such a problem of overhead required for searching all the entries during the purging operation.

The address translation buffer has a plurality of columns each having a plurality of bits for storing pairs of the virtual and real addresses. The storing to the address translation buffer is carried out by writing, into a column indicated by a virtual address lower part in an address translation buffer input register, a set of a virtual address upper part, a real address and a machine attribute in the input register. In the presence of a reference request to the address translation buffer, the address translation buffer reads out the column indicated by the virtual address lower part of the input register, and a comparison circuit compares an output of the virtual address upper part with an output of the virtual address upper part of the input register. A coincidence between the above outputs causes a validation judgement circuit to set an output of the real address of the column in a real address output register. A validity bit indicates whether the column in question is valid or not. For example, when the column is valid, "1" is set at the validity bit; whereas, when the column is invalid, "0" is set thereat.

With such a prior art address translation buffer arrangement, the entry is stored or registered in association with the column indicated by the virtual address lower part, so that, when it is desired to execute the purging operation under the IPTE instruction on the host, it is necessary to search all entries in the address translation buffer.

SUMMARY OF THE INVENTION

It is therefore an object of the present invention to provide an information processor of a virtual machine system comprising an address translation buffer, which can solve the above problems in the prior art and which, even when a large capacity of address translation buffer is employed, can realize a high-speed purging operation of the buffer.

Another object of the invention is to provide a method for reducing the number of entries to be searched within page tables and an address translation buffer, and also to provide an address translation buffer system for implementing the method.

In accordance with an aspect of an address translation buffer system of the present invention, the above objects can be attained by providing an address translation buffer system which comprises an address translation buffer connected to a translation table for translating a virtual address to a real address, the address translation buffer containing a plurality of columns holding a plurality of entries each having a pair of the virtual address and the real address translated based on the translation table and also having a virtual machine classification indicative of a type of the virtual address, a plurality of column control circuits for specifying columns of the address translation buffer with a combination of a lower part of the virtual address and the virtual machine classification as an entry, and circuits, in accordance with an invalidity instruction for purging one of the entries of the address translation buffer, for searching one of the columns of the address translation buffer having one of the entries of the address translation buffer coincided with the virtual machine classification entry of the invalidity instruction and for invalidating the entry including a specified field. The address translation buffer further comprises a buffer input register for holding therein the pair received from the translation table and the virtual machine classifications, and wherein the pair has upper and lower parts of the virtual address and the lower part and the virtual machine classification are input to the column control circuits for searching of the column groups. It is unnecessary to search a group of columns having values other than the specified virtual machine classification.

In the present invention, the address translation buffer is divided into a plurality of continuous zones based on the machine attribute (virtual machine class), the entries each including the virtual and real addresses in pair are registered or stored in the address translation buffer according to the machine attribute. For this reason, even in the case where it is necessary, at the time of the purging operation, to search all the entries of the address translation buffer in the prior art, the present invention is designed to specify the machine attribute to be searched and to thereby reduce the number of entries required to be searched.

FIG. 3A is a block diagram showing a general arrangement of an address translation buffer system in accordance with the present invention. In the drawing, an address translation buffer 21 or a plurality of columns therewithin are previously divided into a plurality of zones (1 to N), that is, a host zone for host page table translation pair, guest zones for guest page table translation pairs, and sub-guest zones under control of a guest with use of the virtual machine classification (VM class or VM mode). When a virtual address lower part 32 of an address translation buffer input register 20 and the virtual machine mode flag of a virtual machine (VM) class field 30 are input to column control circuits 41, 42 and 43 having gate logics associated with the previous divisions to specify a column within the zones of the address translation buffer 21, an entry for storing and reading to and from the address translation buffer 21 is determined. When the purging operation is executed, a searching zone within the address translation buffer 21 is determined through the column control circuits 41, 42 and 43.

When a result of the address translating operation is registered or stored in the address translation buffer 21, a pair of the virtual address upper part 31 and real address 33, VM class field 30 obtained from a flag (to be described later) indicative of whether a running program is a host program or a guest program, a validity bit 34, etc. in the input register 20 are stored in the corresponding entry of the corresponding zone determined by the column control circuits 41, 42 and 43. When a reference request to the address translation buffer 21 is present, the corresponding entry of the corresponding zone of the address translation buffer 21 determined by the column control circuits 41, 42 and 43 is similarly read out, and its virtual address upper part output 36 is compared by a comparison circuit 23 with the virtual address upper part 31 of the input register 20. When finding a coincidence therebetween if an entry is valid, the comparison circuit 23 sets a real address output 37 at the upper part of the real address output register 22. Set at the lower part of the real address output register 22 is the offset address of the input register 20 as it is. A corresponding real storage page address is obtained from the page table in accordance with the invalidate page table entry (IPTE) instruction which includes a field $R_1$ for specifying a general register for instruction of the segment table entry and a field $R_2$ for specifying a general register for instruction of the virtual page address (refer to FIG. 3B).

The execution of the IPTE instruction is carried out as follows in accordance with the VM class field 30 receiving the contents of the VM mode flag as shown in FIG. 3D. In the case of the IPTE instruction to the guest page table in the guest program, the specified guest page table entry is invalidated, and the corresponding zone of the address translation buffer 21 having the guest VM class field 30 is accessed through the column control circuits 41, 42 and 43. When the then host real address output 37 coincides with the host real address of the guest page table entry to be invalidated in the comparator 25, the validity bit 34 of the entry in question is invalidated. In the case of a non-coincidence therebetween, it is judged that another new translation pair is already registered and no invalidating operation is carried out over the address translation buffer. In the case of the IPTE instruction to the host page table in the host program, the specified host page table entry is invalidated, and the corresponding zone of the address translation buffer 21 having the host VM class field 30 in the column is similarly accessed through the column control circuits 41, 42 and 43. When the then host real address output 37 coincides with the host real address of the host page table entry to be invalidated in the comparator 25, the validity bit 34 of the entry in question is invalidated. Further, since the guest virtual address may be allocated to its host virtual address, searching is carried out over all the entries of the zone of the VM class guest of the address translation buffer 21 to invalidate the entry having the coincidence host real address. FIGS. 3C and 3D are diagrams for explaining the VM mode or class flag indicative of whether the IPTE instruction is for the guest page table or for the host page table. When a start interpretive execution (SIE) instruction is executed which is placed in the host program to move the program control from the host to the guest, the VM mode flag is set, i.e., set at "1". When an EXIT instruction is executed which is placed in the guest program to move the program control from the guest to the host, the VM mode flag is reset, i.e., set at "0". In FIG. 3C, arrows indicate a program processing procedure. When the IPTE instruction is executed, the VM mode flag is referred to and it is judged whether the IPTE is to the guest or host page table.

FIGS. 4A and 4B show an example of division of the address translation buffer based on the machine attribute or VM class. More specifically, FIG. 4A is a state before the division based on the VM class and FIG. 4B is a state after the division. In the illustrated example, the address translation buffer is divided into two host and guest zones. In the case of FIG. 4B, since it is required to search only the guest zone under the IPTE instruction to the guest page table, the number of entries to be searched can be reduced and the purging operation of the address translation buffer can be carried out at a high speed.

BRIEF DESCRIPTION OF THE DRAWINGS

FIG. 3B schematically shows how a real page address is obtained from a virtual page address field under an IPTE instruction in the present invention;

FIG. 3D shows a microprogram containing a VM class flag and a VM class operation flag;

FIG. 3E is a flowchart showing an execution state of an IPTE instruction;

FIGS. 4A and 4B show an example of division of an address translation buffer based on machine attributes or VM classes;

FIGS. 5A and 5B show block diagrams of an arrangement of an embodiment of the present invention;

FIGS. 6A and 6B are diagrams for explaining how the address translation buffer is invalidated by invalidation of a page table entry in the virtual machine system.

DESCRIPTION OF THE PREFERRED EMBODIMENTS

Embodiments of the present invention will be detailed below with reference to the accompanying drawings.

Figure 5A:
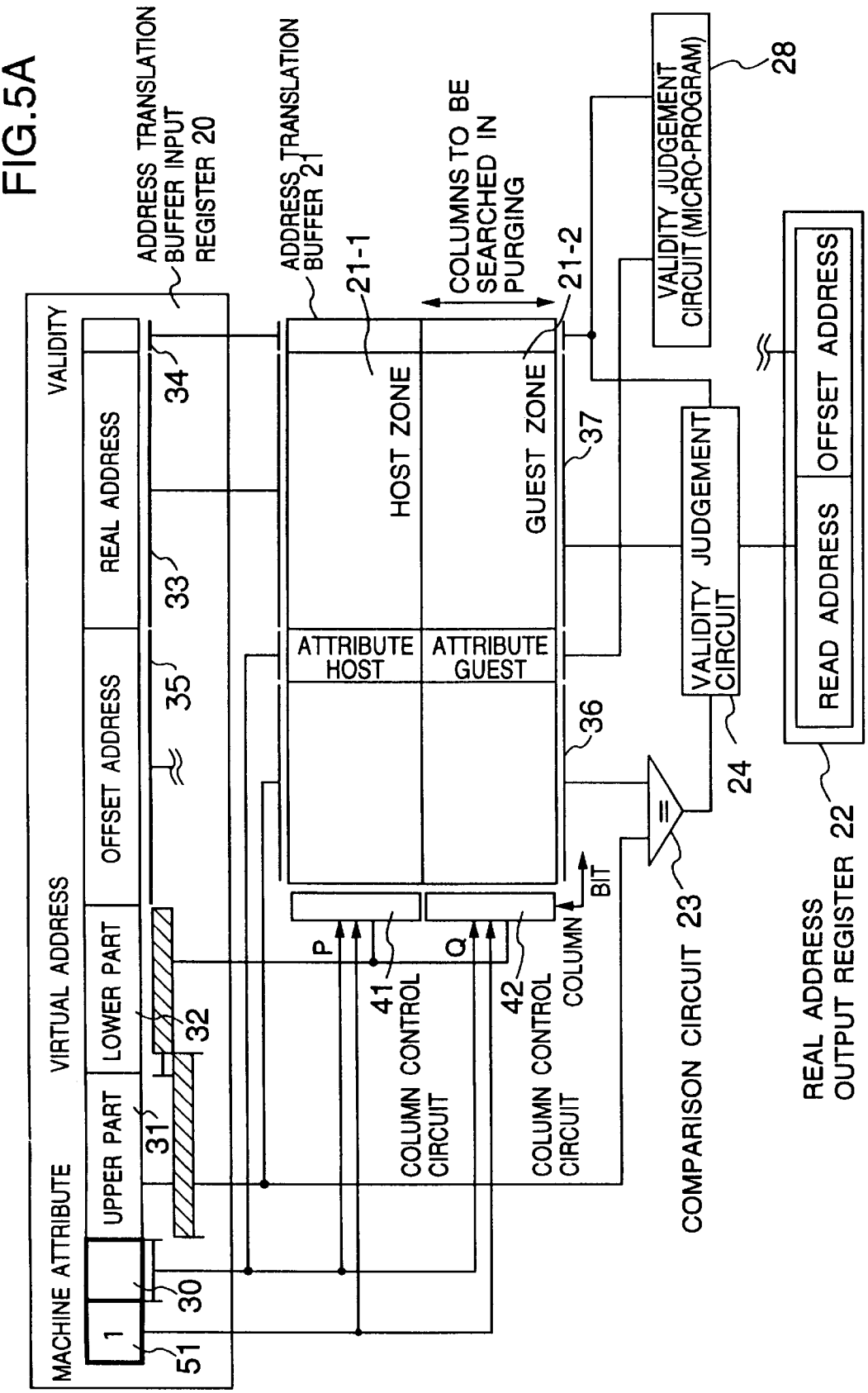

FIGS. 5A and 5B show block diagrams of an arrangement of a first embodiment of the present invention which includes an input register 20 to an address translation buffer. The input register 20 has a virtual address upper part 31, a virtual address lower part 32, a VM class field 30, an address translation buffer division enable bit 51, a real address 33, a validity bit 34 and an offset address 35. At the time of writing/reading data from the buffer, the contents of a VM mode flag shown in FIG. 3D is input to the VM class field 30. Also included in the first embodiment is an address translation buffer 21 which registers the virtual address upper parts 31, VM class (flag indicative of distinction between host and guest in the illustrated example) fields 30, real addresses 33 and validity bits 34 in its entries. Reference numeral 36 denotes an output of the virtual address upper part of the address translation buffer 21, and numeral 37 denotes an output of the real address of the address translation buffer 21. Numeral 22 denotes a real address output register 22, and a comparison circuit 23, in an address translation buffer reference, compares an output of the virtual address upper part 31 of the input register 20 with the output 36 of the virtual address upper part of the address translation buffer 21. Numeral 24 denotes a validity judgement circuit for the real page address. Numeral 41 denotes a column control circuit for addressing the host virtual address (host column control circuit), 42 a column control circuit for addressing the guest virtual address (guest column control circuit). It is assumed in the present embodiment that, when the value of the VM class is "0", the then virtual address is treated as a host virtual address; whereas, when the value of the VM class is "1", it is treated as a guest virtual address.

In FIG. 5A, more specifically, the address translation buffer 21 is divided into two zones each having an equal number of entries, that is, an entry zone (host zone) 21-1 where host virtual address lower parts are continually registered and an entry zone (guest zone) 21-2 where guest virtual address lower parts are continually registered, on the basis of the VM classes. Explanation will next be made as to the entry registering, reading operation and purging operations when the address translation buffer 21 is divided as shown in FIG. 5A. In this case, the address translation buffer division enable bit 51 has a value of "1" fixedly set.

When the address translating operation causes a real address corresponding to the virtual address to be found, the values of the VM class field 30, virtual address upper part 31, virtual address lower part 32 and real address 33 are set in the input register 20 in order to register an entry including a pair of the virtual and real addresses in the address translation buffer 21. When the VM class field 30 of the input register 20 has a value of "0", the virtual address is handled as a host virtual address (refer to FIG. 3C) so that the host column control circuit 41 receives "1" from the address translation buffer division enable bit 51, "0" from the VM class field 30 and the virtual address lower part 32, whereby the values of the virtual address upper part 31, VM class field 30 and real address 33 of the input register 20 as well as "1" of the validity bit 34 indicative of the validity of the entry are written in a column specified by the virtual address lower part 32 within the host zone 21-1 of the address translation buffer 21, thus enabling reading from the entry. When the VM class field 30 of the input register 20 has a value of "1", the virtual address is handled as a guest virtual address so that the guest column control circuit 42 receives "1" from the address translation buffer division enable bit 51, "1" from the VM class field 30 and the virtual address lower part 32, whereby the values of the virtual address upper part 31, VM class field 30 and real address 33 of the input register 20 as well as "1" as the validity bit 34 of the entry are written in a column specified by the virtual address lower part 32 within the guest zone 21-2 of the address translation buffer 21, thus enabling reading from the entry. The attribute and validity can be judged by the validity judgement circuit (28 in FIG. 3A) connected to the address translation buffer 21. When the validity bit of the read-out entry has a value of "0", the value of the read-out entry is invalid.

In this way, when the VM class field 30 is used for the column control, the address translation buffer can be divided into the host and guest zones.

Figure 1A:
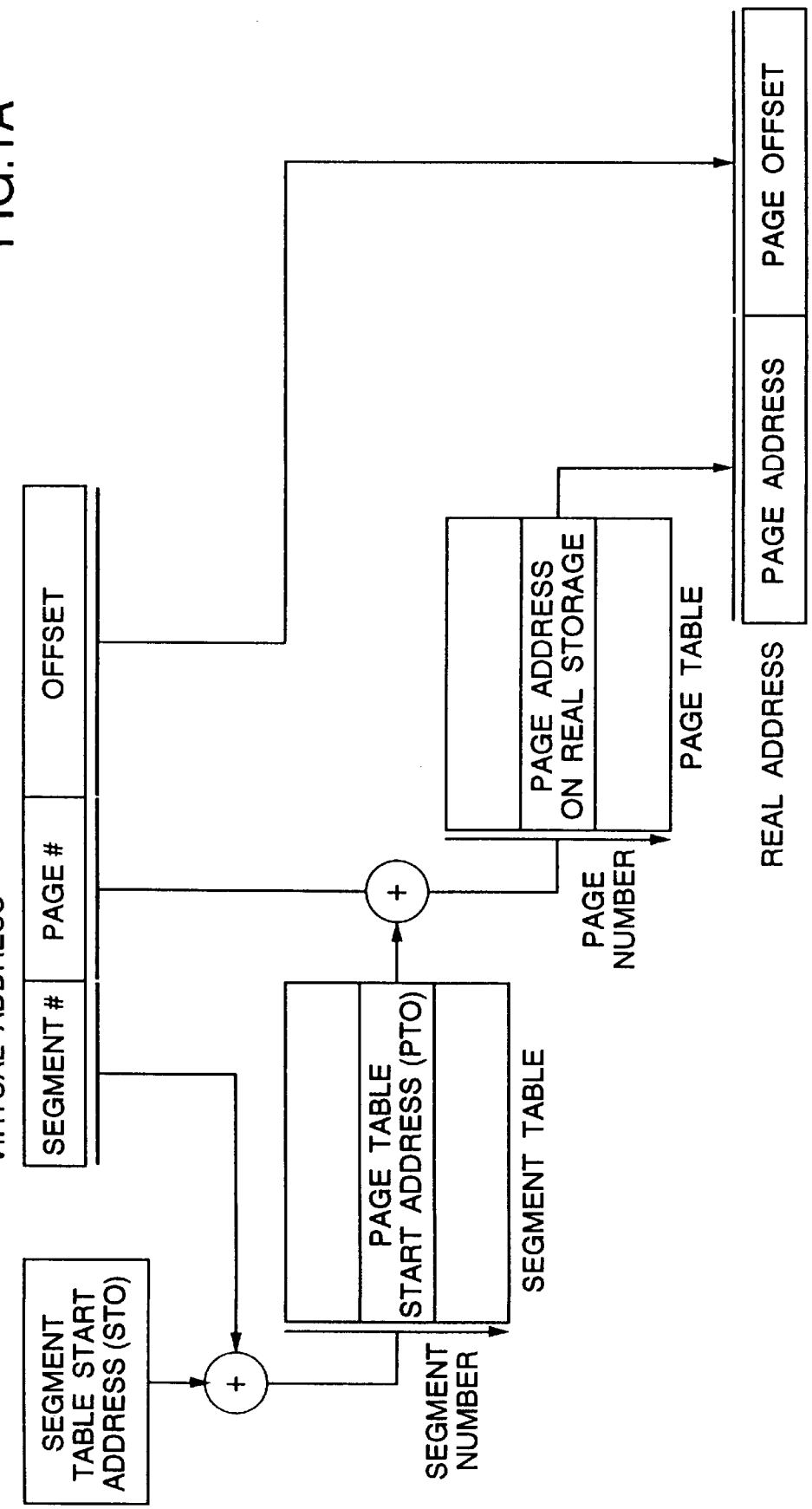
FIG. 1A is a diagram for explaining the conception of address translating operation in a virtual storage system.
Figure 1B:
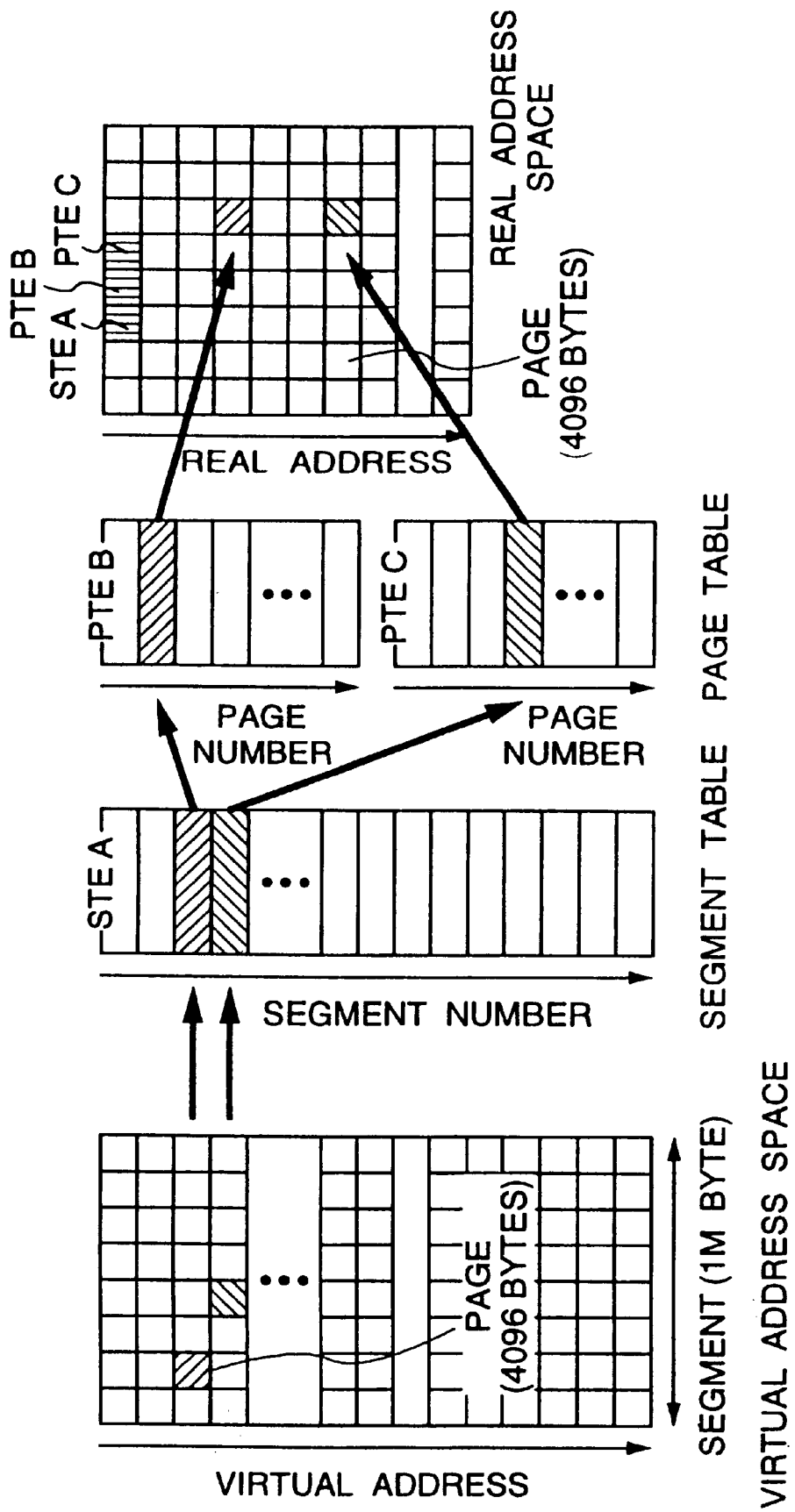
FIG. 1B shows a relationship between virtual and real address spaces.
Figure 2:
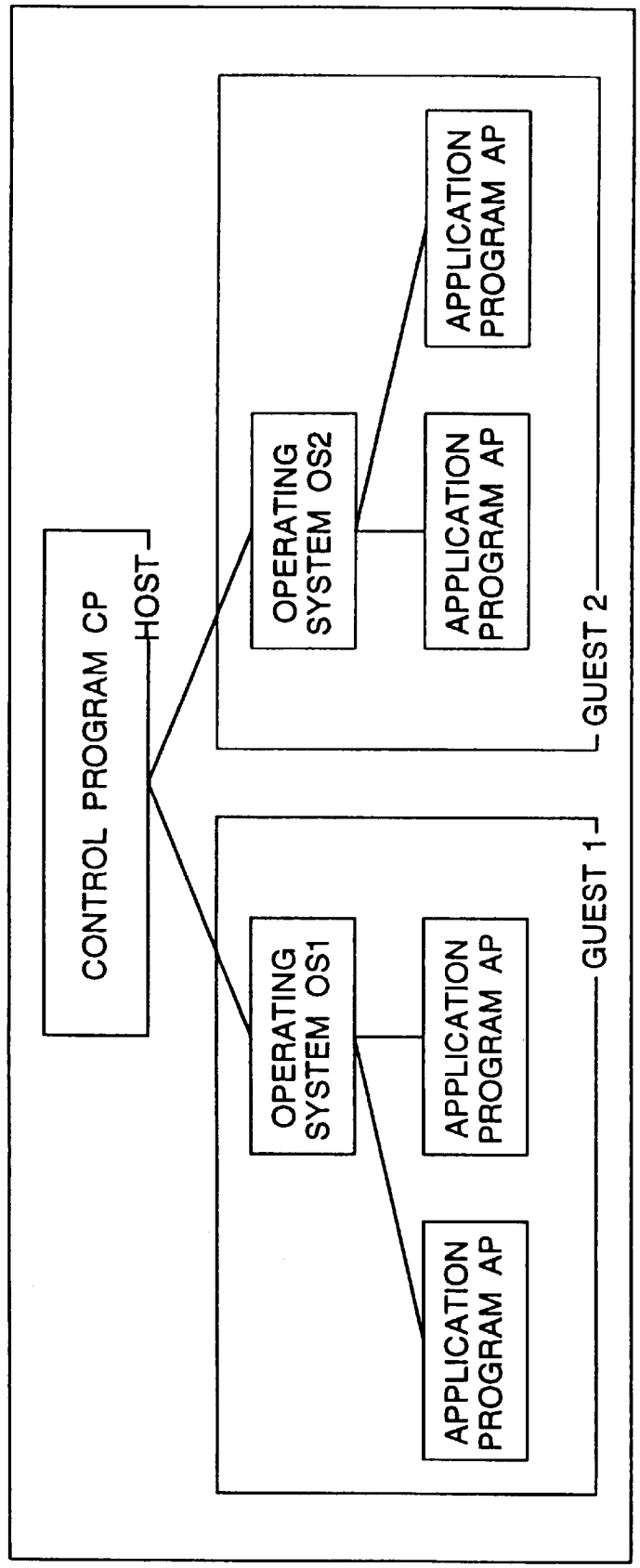
FIG. 2 is a diagram for explaining the conception of a virtual machine system.

Even in the case where it is desired to read out the entry already registered in the address translation buffer 21, when the VM class field of the input register 20 has a value of "0"; "1" of the address translation buffer division enable bit 51, "0" of the VM class field 30 and the virtual address lower part 32 are input to the host column control circuit 41, so that the virtual address upper part output 36 and the real address output 37 can be read out from the column specified by the virtual address lower part 32 within the host zone 21-1 of the address translation buffer 21. When the VM class field of the input register 20 has a value of "1", "1" of the address translation buffer division enable bit 51; "1" of the VM class field 30 and the virtual address lower part 32 are input to the guest column control circuit 42, so that the virtual address upper part output 36 and the real address output 37 can be read out from the column specified by the virtual address lower part 32 within the guest zone 21-2 of the address translation buffer 21. The read-out virtual address upper part output 36 is compared by the comparison circuit 23 with the virtual address upper part 31 of the input register 20. When finding a coincidence therebetween if an entry is valid, the comparison circuit 23 outputs "1" to the validity judgement circuit 24. At this time, the validity judgement circuit 24 sets the real address output 37 received from the address translation buffer 21 to be valid, thereby setting the valid real address output at the real address output register 22. When finding a non-coincidence between its inputs, the comparison circuit 23 performs such address translating operation as shown in FIG. 1 to register the address in the address translation buffer 21 based on the VM class and to later re-read it.

When the address translation buffer 21 is divided into two as shown in FIG. 5A, its total capacity does not vary compared to the non-division case, but the number of columns which can be input as the virtual address lower part 32 for either one of the host and guest will be reduced. Accordingly, it becomes necessary to add the number of bits in the address of the decreased lower part to the virtual address upper part 31 and then to write it into the address translation buffer 21. In the case of the two divisions of the address translation buffer 21, the capacity of the upper part is increased by an amount corresponding to one bit. However, since the address translation buffer 21 has originally a bit width of about 4 bytes per an entry, the above capacity increase is not so large compared to the entire capacity.

In the purging operation of the address translation buffer 21, when the virtual address lower part 32 is input as a column to the host column control circuit 41 or the guest column control circuit 42 to invalidate the both entries of the host and guest zone 21-1 and 21-2, "0" is written into the validity bit 34 of the entry. This results in that the entry cannot be read out until an entry is registered in the column in question.

The IPTE instruction for invalidating the host page table entry invalidates a host virtual address which is registered in the address translation buffer 21 as an entry (refer to FIG. 3B). When it is desired to perform entry searching operation to invalidate the guest virtual address as the entry registered in the address translation buffer 21, since the address translation buffer 21 is divided into the host and guest zones 21-1 and 21-2 based on the VM class field, it is merely required to perform searching operation over only the entries within the guest zone 21-2.

Figure 3A:
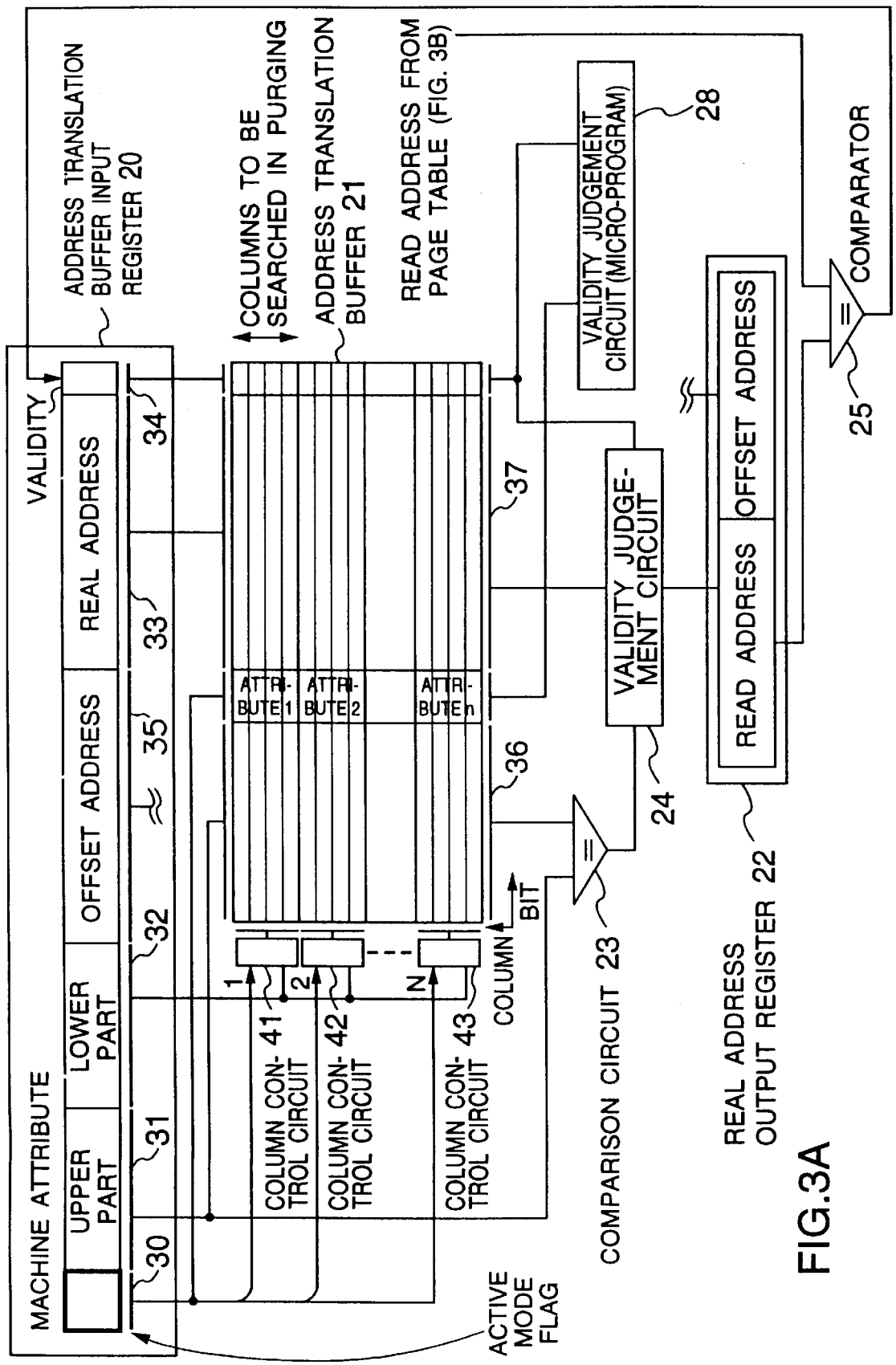
FIG. 3A is a block diagram of a general arrangement of an address translation buffer system in accordance with the present invention.
Figure 3C:
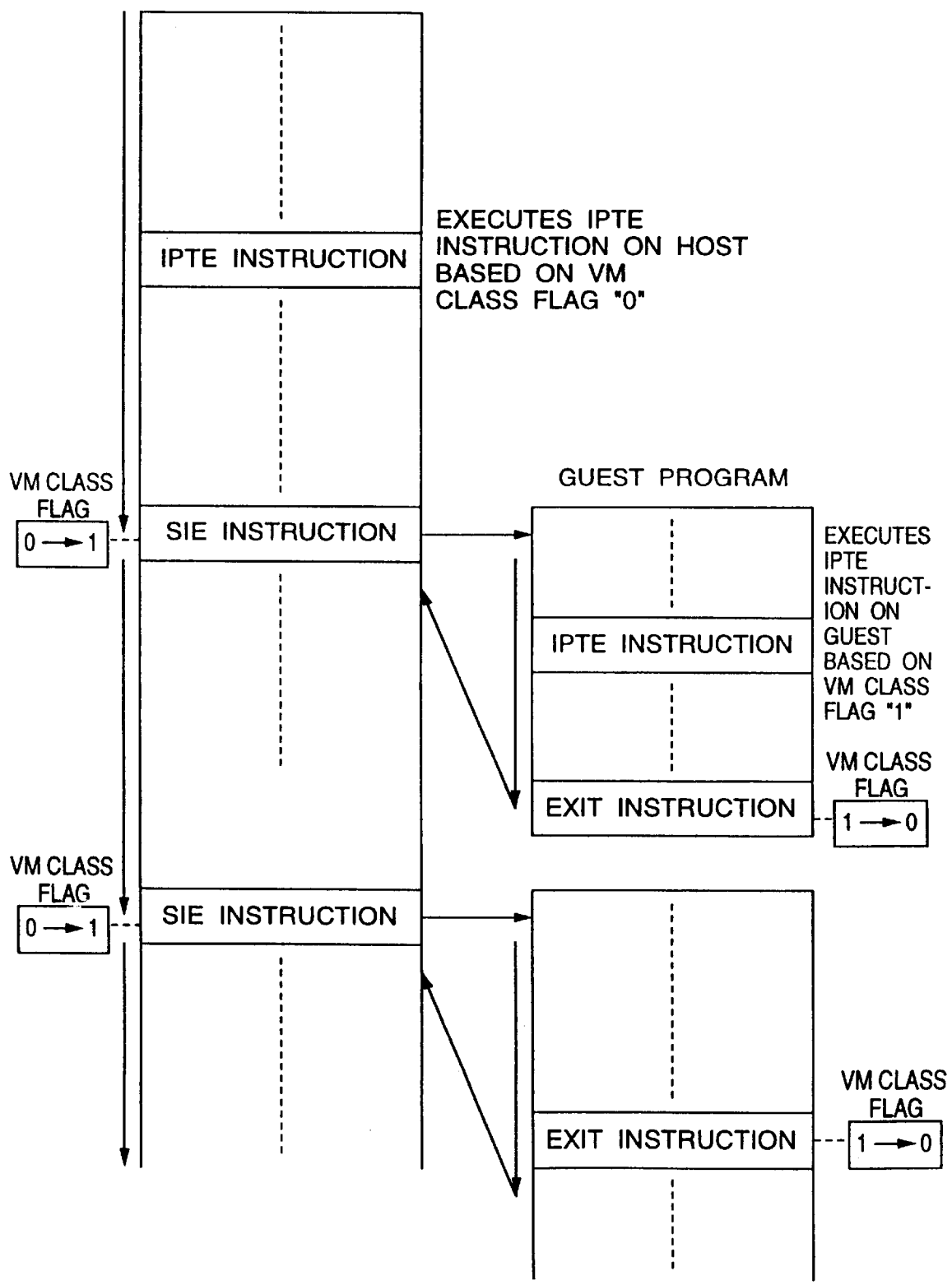
FIG. 3C shows set/reset states of a VM mode or class flag.

In the search of the guest zone; "1" of the address translation buffer division enable bit 51, "1" of the VM class field 30 and the virtual address lower part 32 are input to the guest column control circuit 42; while the virtual address lower part 32 is a value added sequentially by "1" from all "0"s to an upper limit of the number of entries as the specified attribute. And the real addresses registered in the respective entries are read out and compared with the real address of the invalidation page table entry in the comparator 25 as shown in FIG. 3A, and "0" is input to the validity bit 34 having the coincided entry. As a result, the searching operation is carried out only over the guest zone 21-2 of the address translation buffer 21.

In this way, since a zone to be searched can be identified within the address translation buffer 21 in FIG. 5A, the number of entries to be searched can be reduced compared to that in the prior art address translation buffer.

Explanation will next be made as to how to switch between the invalidation of the guest page table entry and the invalidation of the host page table entry. Referring to FIGS. 3D and 3E, the machine when the IPTE instruction is issued is determined to be put in its host mode if the VM mode flag is "0", while the machine is determined to be put in its guest mode if the VM mode flag is "1" (step 301 in FIG. 3E). In the latter case, "1" is set at the VM mode operation flag in FIG. 3D so that the contents of the purging operation in place of the contents of the VM mode flag is sent to the VM class field 30 in FIG. 3A during the purging operation (step 303). In order to invalidate columns within the guest zone of the address translation buffer 21, the buffer virtual address specified by the IPTE instruction is sent from the input register 20 to the control circuit of the address translation buffer 21 and also to the comparison circuit 23 where the coincided column entry is purged (step 305).

In the former case, "0" is set at the VM mode operation flag for sending the VM mode field (step 302). In order to invalidate the host zone of the address translation buffer 21, the virtual address is sent to the address translation buffer 21 where the coincided column entry within the host mode zone is purged (step 304). After the purging operation, "1" is set at the VM mode operation flag (step 306), the buffer virtual address is set to invalidate the coincided entry within the guest zone, the virtual address lower part is counted up, whereby a series of searching operations is carried out (step 310) so that an output of the comparison circuit 23 causes the valid flag of the coincided entry to be reset (step 312).

Shown in FIG. 6A is how to invalidate the address translation buffer when it is desired to invalidate the aforementioned guest page table entry. In this case, the host real address (c) obtained through the address translating operation with use of both the invalidation guest page table entry (a→b) and the host translation table (b→c) is compared with the host real address (c) read out from the entry of the address translation buffer containing the guest virtual address indicated by the invalidation guest page table entry, so that a coincidence therebetween causes invalidation of the entry in question of the address translation buffer. In the case of a non-coincidence therebetween, it is judged that another new translation pair is already registered and the entry of the address translation buffer is not invalidated. In this connection, the host page table entry used in this address translating operation is not invalidated.

Shown in FIG. 6B is how to invalidate the address translation buffer when it is desired to invalidate the aforementioned host page table entry. In this case, the host real address (c) obtained through the address translating operation with use of the invalidation host page table entry (a→b) is compared with the host real address (c) read out from the entry of the address translation buffer, so that a coincidence therebetween causes invalidation of the entry of the address translation buffer. In this connection, the entries of the address translation buffer which are required for reading the host real address for comparison include the entry containing the host virtual address indicated by the invalidation host page table entry and also includes the entry which uses the host page table entry at the time of the 2 guest and host stages of address translating operation and which contains the guest virtual address registered in the address translation buffer. However, it is impossible for the address translation buffer to easily identify that one of the entries of the address translation buffer containing the guest virtual address which uses the invalidation host page table entry.

Explanation will then be made by referring to FIG. 5B as to the operation when the address translation buffer 21 is not divided according to the VM class. In this case, "0" is set at the address translation buffer division enable bit 51. At this time, the input of the VM class field 30 to the host and guest column control circuits 41 and 42 becomes invalid in such a manner that, when receiving an input from the virtual address lower part 32, the address translation buffer 21 operates as an address translation buffer which inputs a virtual address lower part 32. The registering, reading and purging operations over the entries of the address translation buffer 21 are the same as those in the prior art address translation buffer.

As shown in FIG. 5B, when the address translation buffer 21 is not divided into zones, the column input depends only on the virtual address lower part 32 and an entry as new as possible is stored therein, whereby an improved hit rate can be expected.

When the execution time of the all-entries searching operation in the purging operation becomes insignificant, it is desirable not to divide the address translation buffer based on the VM class, because the hit rate can be improved and therefore the effective processing time of the system can be shortened. The division (FIG. 5A) and non-division (FIG. 5B) of the address translation buffer 21 into address spaces can be controllably selected depending on the input of the address translation buffer division enable bit 51 thereto. Change-over between "0" and "1" of the address translation buffer division enable bit 51 is possible when the address translation buffer 21 is put in its fully empty state, that is, when the validity bits 34 of all entries of the address translation buffer 21 have all "0". In particular, with respect to the purging operation, when the value of the address translation buffer division enable bit 51 is suitably selected depending on the characteristics of a system and program to be used, the effective processing time can be further shortened.

Figure 7A:
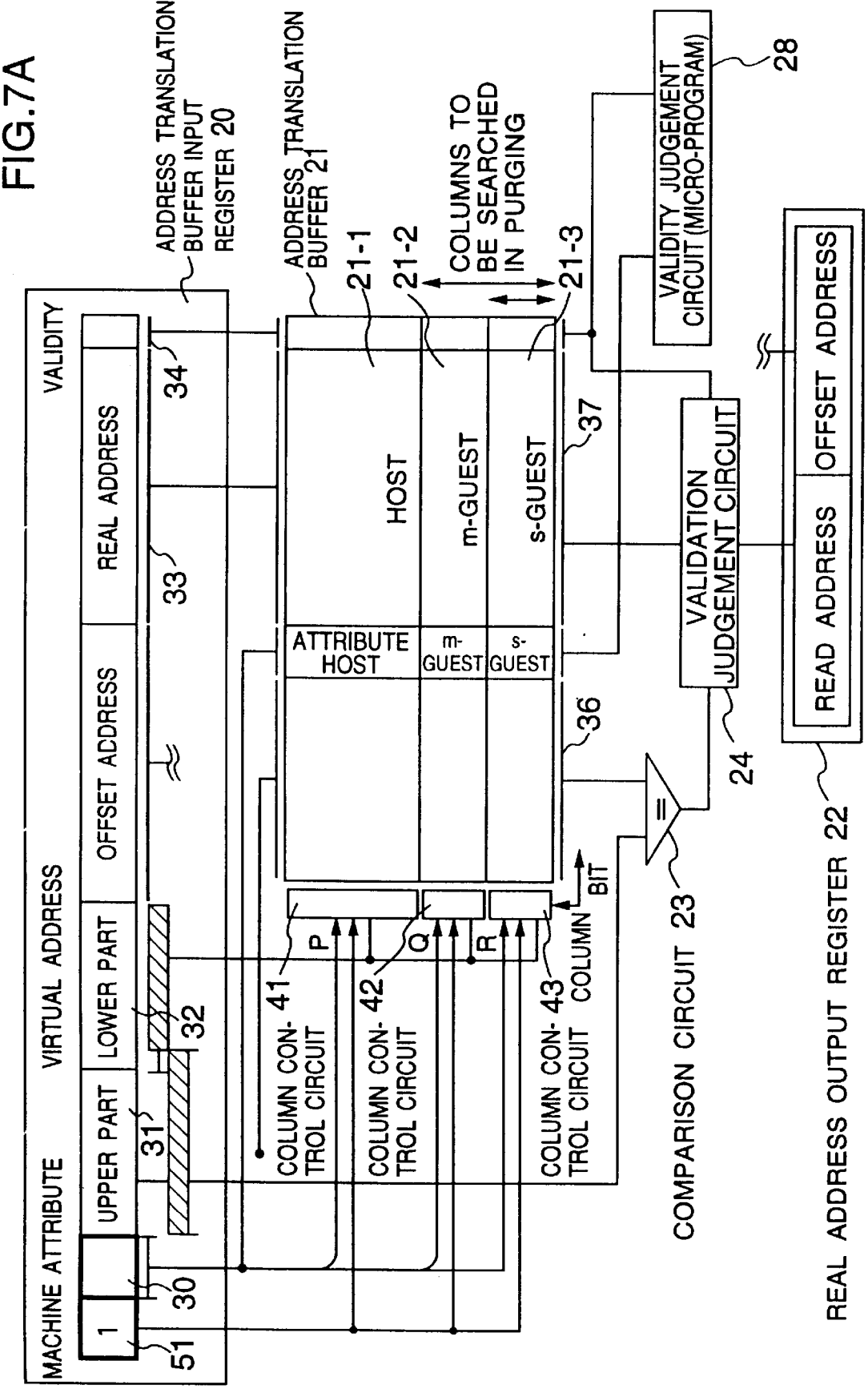
FIGS. 7A and 7B show block diagrams of an arrangement of another embodiment of the present invention.
Figure 7B:
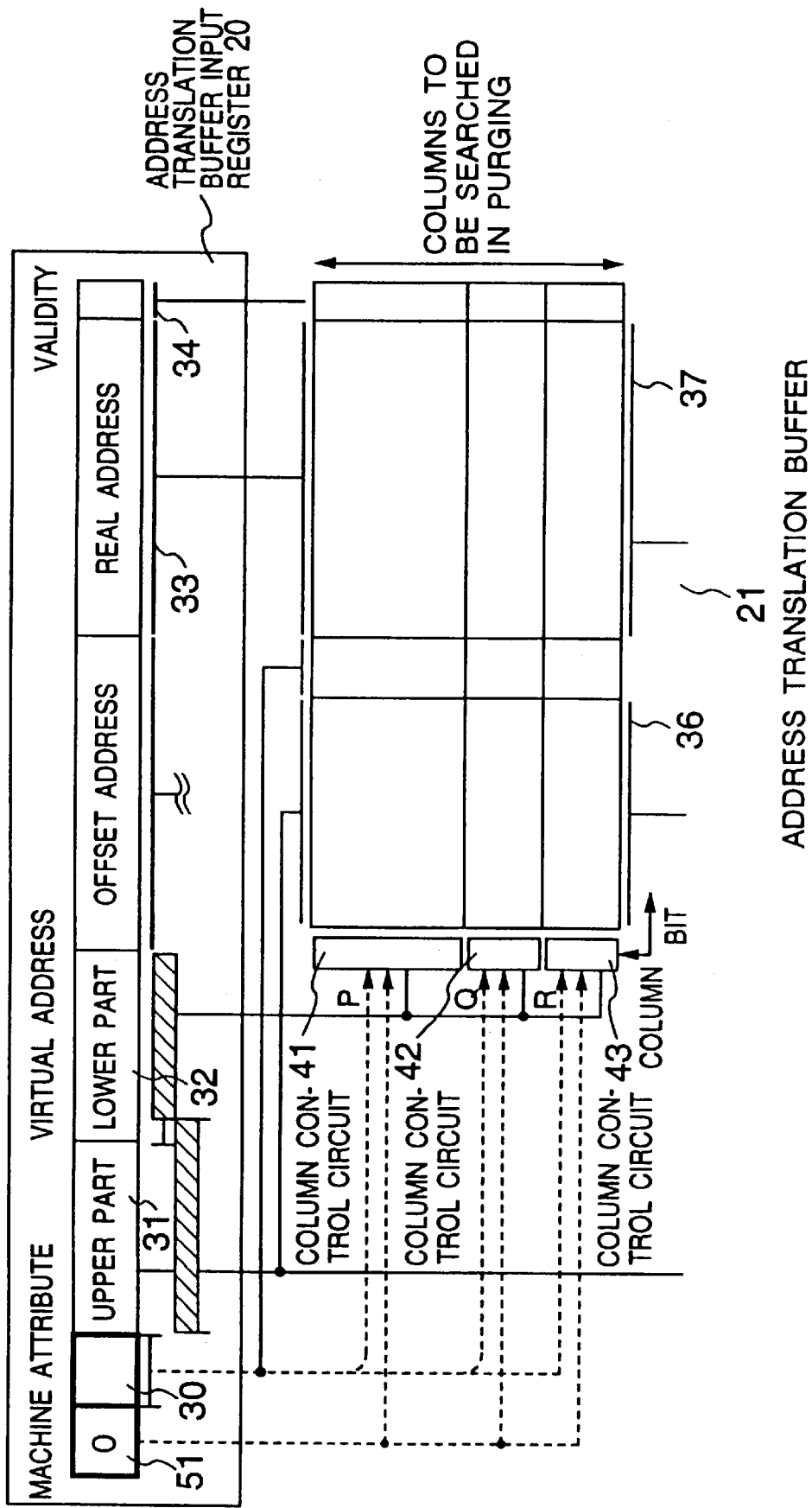

FIGS. 7A and 7B show block diagrams of an arrangement of another embodiment of the present invention. In the virtual machine system, further allocation of the OSs on the guests may be carried out, in which case the respective OSs to be managed by the guests are treated as sub-guests. The 'sub-guests' will be referred to as the s-guests, while guests (main guests) having the s-guests placed thereunder will be referred to as the m-guests, hereinafter. A relationship in the address translating operation between the s- and m-guests is similar to that in the address translating operation between the m-guests and host, so that the real addresses of the s-guests obtained from the virtual addresses of the s-guests based on an s-guest translation table are allocated to an m-guest virtual address space.

In this case, as shown in FIG. 7A, the address translation buffer 21 is divided into a host zone 21-1, an m-guest zone 21-2 and an s-guest zone 21-3; whereas, the column control circuit is made up of 3 sets of column control circuits, that is, a host column control circuit 41 for the host virtual addresses, a m-guest column control circuit 42 for the m-guest virtual addresses, and an s-guest column control circuit 43 for the s-guest virtual addresses. It is assumed in this example that a value "1" is set at the address translation buffer, while, for example, "00" is set at the VM class field 30 for the host, "10" is set thereat for the m-guests, and "01" is set thereat for the s-guests. When the values of the address translation buffer division enable bit 51, VM class field 30 and virtual address lower part 32 are input to the host column control circuit 41, m-guest column control circuit 42 and s-guest column control circuit 43, the entries for the registering, reading and purging operations of the address translation buffer 21 can be specified to the respective divided zones, as in the FIG. 5A.

As shown in FIG. 7A, when the address translation buffer 21 is divided into the host, m-guest and s-guest zones, the purging operation of the address translation buffer which follows is only required to be carried out based on the VM class field 30 of the invalidation page table entry under control of the IPTE instruction. When it is desired to invalidate the s-guest page table entry, the entry within the s-guest zone 21-3 registered in the address translation buffer 21 with the s-guest virtual address is made invalid. When it is desired to invalidate the m-guest page table entry, the entry within the m-guest zone 21-2 registered in the address translation buffer 21 with the m-guest virtual address is made invalid, and also the searching operation is carried out over the s-guest zone 21-3. When it is desired to invalidate the host page table entry, the entry within the host zone 21-1 registered in the address translation buffer 21 with the host virtual address is made invalid, and the searching operation is also carried out over the m-guest zone 21-2 and s-guest zone 21-3.

In the searching operation to the m-guest zone 21-2, "1" of the address translation buffer division enable bit 51, "10" of the VM mode field 30 sending from VM operation flag and the virtual address lower part 32 are input to the m-guest column control circuit 42; while the value of the virtual address lower part 32 is input with values added sequentially by "1" from all "0"s to an upper limit of the number of entries as the specified attribute. And the real address outputs 37 registered in the respective entries are read out and compared with the real address of the invalidation page table entry, and "0" is input to the validity bit 34 having the coincided entry as a result of the comparison. As a result, the searching operation is carried out over only the m-guest zone 21-2 of the address translation buffer 21. In the searching operation over the s-guest zone 21-3, similarly, "1" of the address translation buffer division enable bit 51, "01" of the VM class field 30 and virtual address lower part 32 are input to the s-guest column control circuit 43; while the virtual address lower part 32 is input with a value added sequentially by "1" from all "0"s to an upper limit of the number of entries as the specified attribute. And the real address outputs 37 registered in the respective entries are read out and compared with the real address of the invalidation page table entry, and "0" is input to the validity bit 34 having the coincided entry as a result of the comparison. As a result, the searching operation is carried out only over the s-guest zone 21-3 of the address translation buffer 21.

In this way, when the searching zone of the address translation buffer 21 is specified, the number of entries to be searched over the m-guest and s-guest zones 21-2 and 21-3 in the purging operation of the host virtual address as well as the number of entries to be searched over the s-guest zone 21-3 in the purging operation of the m-guest virtual address under the IPTE instruction can be reduced when compared to those in the searching operation of all entries of the prior art.

When the address translation buffer 21 is not divided based on the VM class 30, the value of the address translation buffer division enable bit 51 is fixed at "0" as shown in FIG. 5B. This enables realization of the registering, reading and purging operations similar to those of the address translation buffer in the prior art.

In the case of the two types of attributes, i.e., guest and host; the VM class flag may comprise one bit. The present invention is not limited to such division examples as shown in FIGS. 5A, 5B, 7A and 7B. For example, when the configuration of the VM class is made to reflect on the arrangement of the host and guest column control circuits, the division ratio between the guest and host zones of the address translation buffer can be changed, a plurality of sub-guest zones (3 to N) can be provided, the number of divisions of the guest zone can be changed, or various patterns of divisions can be implemented.

What is claimed is:

1. An address translation buffer system, comprising:

an address translation buffer connected to a translation table for translating a virtual address to a real address, said address translation buffer including a plurality of columns holding a plurality of entries each having a pair of said virtual address and the real address translated based on said translation table and also having a virtual machine classification indicative of a distinction between virtual and host machines;

a plurality of column control circuits for specifying columns of said address translation buffer with a combination of a lower part of said virtual address and said virtual machine classification indicative of the distinction between virtual and host machines as an entry; and means, in accordance with an invalidation instruction for purging one of the entries of said address translation buffer, for searching one of the columns of said address translation buffer having one of the entries of said address translation buffer coincided with said virtual machine classification entry of said invalidation instruction and for invalidating the entry including a specified field.

2. A system as set forth in claim 1, wherein said address translation buffer has a group of continual columns specified by a value of said virtual machine classifications and another group of continual columns specified by another value different from said value, and said column control circuits, when counting up a lower part of said virtual address, search one column group based on the specified virtual machine classification.

3. A system as set forth in claim 2, further comprising a buffer input register for holding therein said pair received from said translation table and said virtual machine classifications, and wherein said pair has upper and lower parts of the virtual address and said lower part and said virtual machine classification are input to said column control circuits for searching of said column groups.

4. A system as set forth in claim 2, wherein said virtual machine classification has a value of 1 bit indicative of either one of host and guest virtual addresses.

5. A system as set forth in claim 2, wherein said virtual machine classification has a value of a plurality of bits indicative of either one of the host virtual address and a plurality of guest virtual addresses.

6. A system as set forth in claim 1, further comprising a buffer input register for holding therein said pair received from said translation table and said virtual machine classifications, and wherein said pair has upper and lower parts of the virtual address and said lower part and said virtual machine classification are input to said column control circuits for searching of said column groups.

7. A system as set forth in claim 6, wherein said virtual machine classification has a value of 1 bit indicative of either one of host and guest virtual addresses.

8. A system as set forth in claim 6, wherein said virtual machine classification has a value of a plurality of bits indicative of either one of the host virtual address and a plurality of guest virtual addresses.

9. An address translator, comprising:

a guest translation table for translating a guest virtual address to a guest real address;

a host translation table for translating said guest real address to a host real address;

an address translation buffer for containing a plurality of entries each having a pair of said guest virtual address and said host real address translated based on said guest translation table and said host translation table and a virtual machine classification indicative of a type of the virtual address and also for containing a plurality of entries each having a pair of a host virtual address and said host real address translated based on said host translation table and a virtual machine classification indicative of a distinction between virtual and host machines;

a plurality of column control circuits for specifying the entries of said address translation buffer with a combination of a lower part of said virtual address and said virtual machine classification indicative of the distinction between virtual and host machines;

means, in accordance with an invalidation instruction for purging one of the entries of said address translation buffer, for searching one of the columns of said address translation buffer having one of the entries of said address translation buffer coincided with said virtual machine classification entry of said invalidation instruction and for invalidating the entry including a specified field.

10. An address translator as set forth in claim 9, wherein said address translation buffer has a group of continual columns specified by a value of said virtual machine classifications and another group of continual columns specified by another value different from said value, and said column control circuits, when counting up a lower part of said virtual address, search one column group based on the specified virtual machine classification.

11. An address translator as set forth in claim 10, further comprising a buffer input register for holding therein said pair received from said translation table and said virtual machine classifications, and wherein said pair has upper and lower parts of the virtual address and said lower part and said virtual machine classification are input to said column control circuits for searching of said column groups.

12. An address translator as set forth in claim 10, wherein said virtual machine classification has a value of 1 bit indicative of either one of host and guest virtual addresses.

13. An address translator as set forth in claim 12, wherein said virtual machine classification has a value of a plurality of bits indicative of either one of the host virtual address and a plurality of guest virtual addresses.

14. An address translator as set forth in claim 9, further comprising a buffer input register for holding therein said pair received from said translation table and said virtual machine classifications, and wherein said pair has upper and lower parts of the virtual address and said lower part and said virtual machine classification are input to said column control circuits for searching of said column groups.

15. An address translator as set forth in claim 14, wherein said virtual machine classification has a value of 1 bit indicative of either one of host and guest virtual addresses.

16. A virtual machine system, comprising:

at least one guest machine running on a real machine;

a microprogram containing a virtual machine mode flag indicative of whether said guest machine or a host machine is running; and an address translation mechanism for performing its address translating operation for said guest machine, wherein said address translation mechanism includes:

a guest translation table for translating a guest virtual address to a guest real address, a host translation table for translating said guest real address to a host real address, an address translation buffer for storing a plurality of entries each having a pair of said guest virtual address and said host real address translated based on said guest translation table and said host translation table and a virtual machine mode flag indicating whether said guest or host machine is running and also for storing a plurality of entries each having a pair of host virtual address and said host real address translated based on said host translation table and said virtual machine mode flag, a plurality of column control circuits for specifying the entries of said address translation buffer with a combination of a lower part of said virtual address and said virtual machine classification, and means, in accordance with an invalidity instruction for purging one of the entries of said address translation buffer, for searching one of the columns of said address translation buffer having one of the entries of said address translation buffer coincided with said virtual machine mode flag of said invalidity instruction and for invalidating the entry including a specified field.

17. A system as set forth in claim 16, wherein said address translation buffer has a group of continual columns specified by values of said virtual machine mode flag and another group of continual columns specified by values different from said values, and said column control circuits, when counting up a lower part of said virtual address, search said respective column groups based on the specified virtual machine mode flag.

18. A system as set forth in claim 17, further comprising a buffer input register for holding therein said pair received from said translation table and said virtual machine mode flag, and wherein said pair has upper and lower parts of the virtual address and said lower part and said virtual machine mode flag are input to said column control circuits for searching of said column groups.

19. In an information processor of a virtual machine system comprising an address translation buffer holding a plurality of entries each having a pair of a virtual address and a real address, a method of managing said plurality of entries within said address translation buffer comprising the steps of:

preparing said address translation buffer having a plurality of zones each having a series of continual entries based on a machine attribute distinguishing between host and guest machines;

holding the entries within the corresponding zones based on said machine attribute; and at the time of performing purging operation over one of the entries according to a purge instruction, specifying a searching zone according to the machine attribute specified by said purge instruction.

20. A method as set forth in claim 19, wherein said address translation buffer is divided into host and guest zones according to said machine attribute indicative of a guest virtual address or a host virtual address.

21. A method as set forth in claim 19, further comprising a step of counting up the specified buffer entry for searching of said zones, and a step of setting an invalidation flag at an entry whose real address coincides through the searching of said zones of the address translation buffer.

* * * * *